No. 742,256. PATENTED OCT. 27, 1903.
J. F. STEWARD.
HARVESTING MACHINE.
APPLICATION FILED MAR. 25, 1903.
NO MODEL.
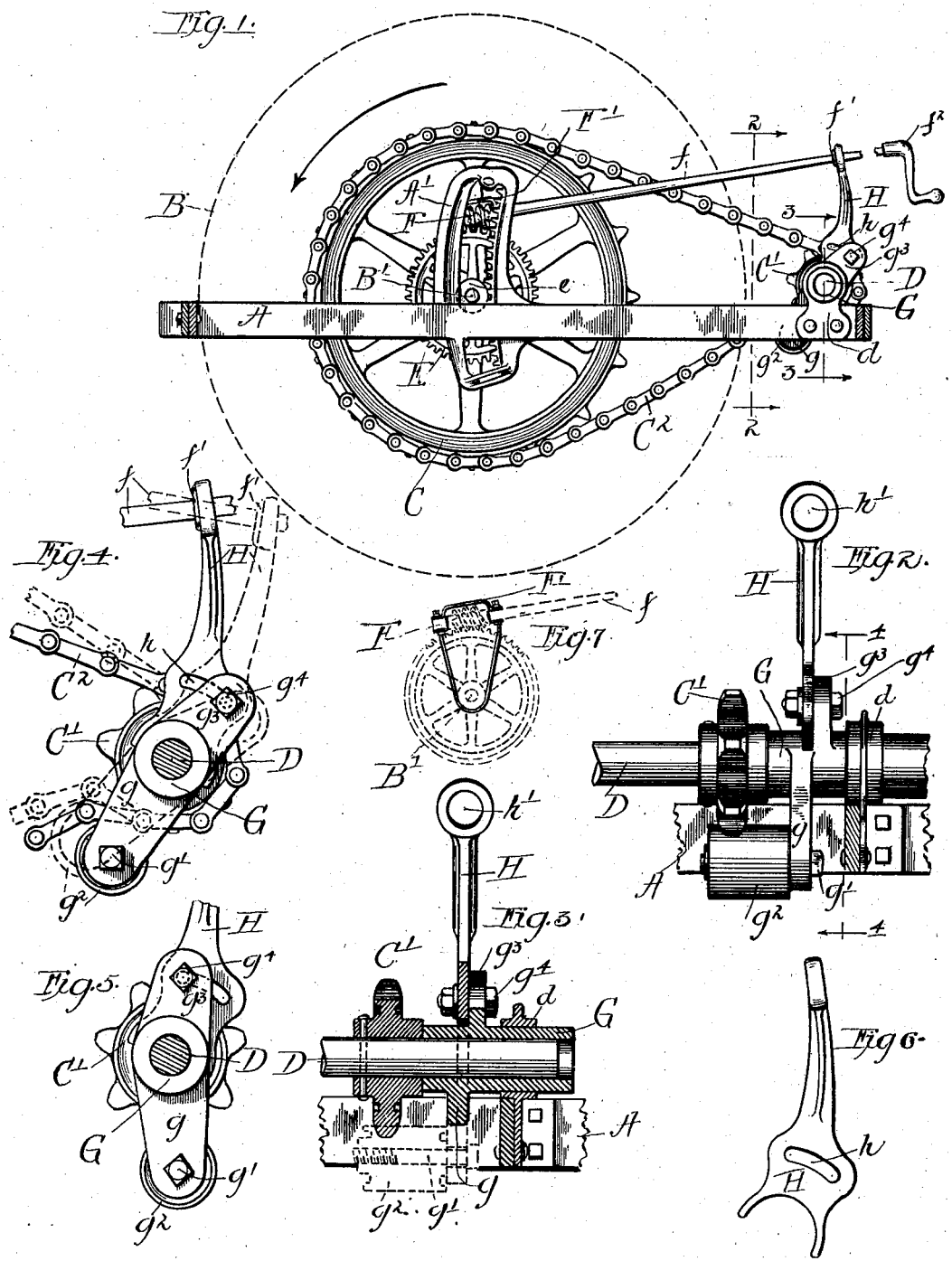

No. 742,256.

Patented October 27, 1903.

UNITED STATES PATENT OFFICE.

JOHN F. STEWARD, OF CHICAGO, ILLINOIS, ASSIGNOR TO INTERNATIONAL HARVESTER COMPANY, A CORPORATION OF NEW JERSEY.

HARVESTING-MACHINE.

SPECIFICATION forming part of Letters Patent No. 742,256, dated October 27, 1903.

Application filed March 25, 1903. Serial No. 149,450. (No model.)

*To all whom it may concern:*

Be it known that I, JOHN F. STEWARD, a citizen of the United States, residing at Chicago, in the county of Cook and State of Illinois, have invented a new and useful Improvement in Harvesting-Machines, of which the following is a complete specification.

This invention relates to the mechanism in harvesting-machines by which the raising and lowering of the main frame on the main supporting-wheel is effected, and more specifically to the novel arrangement of certain parts of the said raising and lowering device with the drive-chain tightener.

This invention has for its object the construction of a chain-tightening device which will automatically preserve a definite position relative to the line of centers of the cross-shaft and main wheel, and thus keep the driving-chain of a uniform tightness at whatever height the frame is adjusted.

In the accompanying drawings, Figure 1 represents a side elevation of that portion of a harvester-frame with which my improvement is connected. Fig. 2 is a view as indicated by the line 2 2 in Fig. 1, showing in front elevation the portion of the cross-shaft on which is mounted my improvement. Fig. 3 is a longitudinal section of same as shown by the line 3 3 in Fig. 1. Fig. 4 is a transverse section through the cross-shaft, showing the chain-tightener and associated parts. Fig. 5 represents a similar view, but with some of the parts in a changed position. Fig. 6 is a detail of the supporting-arm; and Fig. 7 is a side elevation of the worm and worm-rod support, the said worm, worm-rod, and worm-gear being shown in dotted lines.

Referring to the drawings, A designates a portion of the main frame of a harvester, B the main supporting and driving wheel, (shown in dotted lines,) and C the main driving sprocket-wheel as one piece with said main wheel.

D is the cross-shaft, journaled in suitable bearings on the rear of the main frame, and $d$ is one of such supporting-bearings.

A' designates one of the main-wheel quadrants, and B' the main-wheel axle, upon which loosely sleeves the main wheel B and the attached sprocket-wheel C. E is the worm-gear, secured to said main-wheel axle B', and integral therewith is the pinion $e$, adapted to mesh with the toothed segment of the main-wheel quadrant A'.

F is the worm, meshing with the worm-gear E and is mounted upon the forward end of the rearwardly-extending rod $f$, which, with the worm thereon, journals in a support F', the pivotal center of which is coincident with the center of the main-wheel axle B'. By this rod $f$ the raising and lowering device is actuated and the chain-tightener is also controlled.

C' is the small drive sprocket-wheel, secured to the cross-shaft D, and $C^2$ designates the sprocket-chain connecting it with the driving sprocket-wheel C.

Since the foregoing are elements common to the ordinary type of harvester and present nothing novel in their construction or operation, further description thereof will not be given.

G is a journal-box which affords a bearing for the grainward end of the cross-shaft D and is itself sustained in the support $d$, in which it is free to rotate. This journal-box is provided with a downwardly-extending arm $g$, and to the free end of this arm is secured a stud-bolt $g'$, on which journals the chain-tighener roller $g^2$. This roller $g^2$ occupies a position in the plane of the chain $C^2$, as may be understood by reference to Figs. 2 and 3, so that as the journal-box G is rotated in its bearing $d$ the said roller will bear against the chain, taking up the slack thereof and tightening it in the well-known manner. Projecting upwardly from the journal-box is the lug $g^3$, provided with an aperture therein for receiving the bolt $g^4$, which secures to said lug the arm H. This arm H conforms on its inner end to the curvature of the journal-box G, which it partly surrounds, and is provided with an arcuate slot $h$, adapted to receive the bolt $g^4$, and thereby permit angular adjustment of the chain-tightener arm relative to the said arm H. To prevent possible slipping between the said lug and arm, their contacting surfaces might be corrugated, but are shown smooth. The upper end of the arm H terminates in a laterally-disposed opening $h'$, which receives and supports the rod $f$. Integral with the rod $f$ is formed the shoulder $f'$, serving as a stop to limit the forward movement of the said arm H. It is evident that the same result would be accomplished should the adjustment be made by means of an adjustable collar on the rod $f$ abutting the arm H instead of the adjustment between said arm H and the journal-box G with the fixed shoulder $f'$ on said rod. It is also evident that the arms $g$ and H could be of a lever pivoted to the main frame independent of the cross-shaft or cross-shaft bearing. As the worm F is as one piece with the rod $f$, rotary motion imparted to the said rod by the crank $f^2$ will operate to rotate the gear E and the attached pinion $e$, thus causing the main-wheel quadrant and connected frame to be correspondingly raised or lowered in the usual way.

If it is desired to tighten the chain $C^2$ by taking up the slack therein, the bolt $g^4$ is loosened, and the journal-box G, with the arm $g$ and the chain-tightener roller $g^2$ thereon, will be swung around until the said roller bears tightly against the chain, as shown in Fig. 4. The arm H is caused to bear against the shoulder $f'$ in this adjustment, and the bolt $g^4$ is again tightened. The stress of the driving-chain on the pulley $g^2$ will tend to rotate the journal-box G in its bearing $d$; but such movement is restrained by the arm H bearing against the shoulder $f$. The end thrust thus put upon this rod is received and resisted by the worm-gear E and the worm-support F'. Having tightened the chain by the above-described adjustment, it will remain at the same tension in the raising and lowering of the frame because of the following fact: Assuming that it is desired to lower the frame, the crank $f^2$ is turned in the proper direction, and since the rear end of the rod $f$ is upwardly inclined it follows that as the frame of the machine is dropped vertically the shoulder $f'$ on the said rod $f$ will push rearwardly the arm H and correspondingly raise the roller-carrying arm $g$, thus causing the roller $g^2$ to follow the retreating chain $C^2$. From the above it is seen that through the rod $f$ not only is the raising and lowering device actuated, but the chain-tightener is also controlled. The positions of the arms H and $g$ and the drive-chain $C^2$ after the above-described adjustment has been made are shown by dotted lines in Fig. 4.

What I claim as my invention, and desire to secure by Letters Patent, is—

1. In a grain-harvesting machine, in combination a main wheel, a main-wheel axle, a main frame supported thereon and vertically adjustable relative thereto, main-wheel quadrants, quadrant-engaging pinions secured to said main-wheel axle, a cross-shaft journaled in bearings on the main frame, a chain-tightener, the pivotal axis of which is substantially coincident with that of the said cross-shaft, and means extending from said main-wheel axle to said chain-tightener for controlling the said chain-tightener and for rotating said main-wheel axle, substantially as described.

2. In a grain-harvesting machine, in combination a main frame, a main supporting-wheel, a device for raising or lowering said main frame relative to said supporting-wheel, an actuating-rod in connection with said raising and lowering device, and a chain-tightener pivotally mounted upon the frame of said harvester and controlled by the said actuating-rod, and a cross-shaft mounted upon the said main frame, the said chain-tightener having its pivotal bearing coincident with said cross-shaft, substantially as described.

3. In a grain-harvesting machine, in combination a main frame, a main supporting-wheel, a chain-tightener pivotally mounted upon the said main frame of the harvester, an arm with which the said chain-tightener is adjustably related, a device for raising or lowering said main frame relative to said supporting-wheel, an actuating-rod in connection with said raising and lowering device, the said rod engaging the said arm and having rotative movement to actuate the said raising and lowering device and a rocking movement about the center of the said supporting-wheel to actuate the chain-tightener substantially as described.

4. In a grain-harvesting machine, in combination a main frame, a main supporting-wheel, a device for raising or lowering said main frame relative to said supporting-wheel, said device having an actuating-rod in connection therewith, a cross-shaft, and a chain-tightener pivotally mounted upon said main frame, the pivotal axis thereof being substantially coincident with said cross-shaft, said chain-tightener provided with an arm with which it is adjustably related, the said arm adapted to engage the actuating-rod of said raising and lowering device and to be controlled thereby, substantially as described.

5. In a grain-harvesting machine, in combination a main frame, a main supporting-wheel, a device for raising or lowering said main frame relative to said supporting-wheel, said device having an actuating-rod in connection therewith, a rotatable journal-box supported upon the said main frame, a cross-shaft journaling therein, a roller-bearing arm integral with said journal-box, and an arm controlled by said actuating-rod and supported on said journal-box which is adjustable relative thereto, substantially as described.

6. In a grain-harvesting machine, in combination a main frame, a main supporting-wheel, a device for raising or lowering said main frame relative to said supporting-wheel, an actuating-rod in connection with said raising and lowering device, a chain-tightener consisting of a lever pivotally secured to the main frame of said harvester and having two arms angularly adjustable relative to each other, one of said arms supporting a roller which bears against the main drive-chain of said harvester and the other arm engaging the actuating-rod of said raising and lowering device and controlled thereby, thus causing the said arms of the chain-tightener to maintain a definite position relative to the driving-chain, substantially as described.

JOHN F. STEWARD.

In presence of—
  J. C. WARNES,
  T. H. ALFREDS.